United States Patent

Kohzai et al.

[11] 4,347,470
[45] Aug. 31, 1982

[54] SPINDLE ORIENTATION CONTROL APPARATUS

[75] Inventors: Yoshinori Kohzai; Yoshiki Fujioka; Naoto Ota, all of Hino, Japan

[73] Assignee: Fujitsu Fanuc Limited, Japan

[21] Appl. No.: 236,623

[22] Filed: Feb. 20, 1981

[30] Foreign Application Priority Data

Feb. 23, 1980 [JP] Japan ................. 55-21817

[51] Int. Cl.³ ............................................. G05B 19/28
[52] U.S. Cl. ................................. 318/602; 318/594; 318/603
[58] Field of Search ............... 318/594, 600, 601, 602, 318/603; 364/474, 475

[56] References Cited

U.S. PATENT DOCUMENTS 3,700,993 10/1972 Fischer ............................ 318/603
4,023,084 5/1977 Owa ................................. 318/603
4,101,817 7/1978 Maeda et al. .................... 318/603

Primary Examiner—B. Dobeck
Attorney, Agent, or Firm—Staas & Halsey

[57] ABSTRACT

A spindle orientation control apparatus having a motor for driving a spindle, speed control means for rotating the spindle at a speed in accordance with a command speed, and position control means for stopping the spindle at a commanded stopping position. The apparatus is further provided with stopping position command means for digitally instructing the spindle stopping position, a position sensor, error monitoring means for monitoring an error between the commanded stopping position and the actual rotational position of the spindle and for generating a signal when the error attains a predetermined value, and means for generating a signal indicative of an orientation speed. When the apparatus is in a spindle orientation control mode, the spindle is speed-controlled so as to rotate at the orientation speed until the error monitoring means generates said signal, and is position-controlled after the generation of the signal so as to reduce the error to zero.

6 Claims, 10 Drawing Figures

SPINDLE ORIENTATION CONTROL APPARATUS

BACKGROUND OF THE INVENTION

This invention relates to a spindle orientation control apparatus, and more particularly to a spindle orientation control apparatus which is capable of stopping a spindle and an arbitrary rotational position.

A spindle provided on a numerically controlled machine tool must be capable of rotation at arbitrary speeds. Another capability recently demanded of such machine tools is that the spindle be stoppable at arbitrary rotational positions with a high level of accuracy. Such is the case in machining centers, for example, where a spindle must be stopped at predetermined rotational positions when automatically changing tools, or when carrying out turning, drilling or tapping work on a workpiece at a predetermined angular position thereof by means of a lathe or turning center. In conventional practice, however, the rotational positions at which the spindle is to be stopped are in many cases decided in advance, and it is not possible to stop the spindle accurately at arbitrary rotational positions other than those rotational positions already decided. Although there are some conventional systems that do permit the above (such as disclosed in Japanese Pat. No. 49-47355 published Dec. 14, 1974; Applicant Kerney and Trecker Corporation), these systems require both speed and position control motors for driving the spindle as well as and a motor changeover mechanism such as a clutch, and position and speed control loops must be provided independently of each other. As a result, such systems are high in cost and large in size.

BRIEF SUMMARY OF THE INVENTION

Accordingly, it is an object of the present invention to provide an inexpensive spindle orientation control apparatus which does not incur an increase in size.

It is another object of the present invention to provide a spindle orientation control apparatus which is capable of rotating a spindle at arbitrary speeds and of stopping the spindle at arbitrary rotational positions.

It is a further object of the present invention to provide a spindle orientation control apparatus which is capable of orienting a spindle continuously at a high level of accuracy and in a rapid manner without repeatedly restoring the spindle to a home position and without bringing the spindle to a temporary halt prior to its final orientation, even when the spindle is rotating at the time that the orientation command is received.

It is still another object of the present invention to provide a spindle orientation control apparatus which need not be provided with a sensor for sensing the home position.

Yet another object of the present invention is to provide a spindle orientation control apparatus in which the only command that need be given is the angle between the home position and the rotational position at which the spindle is to be stopped.

Other features and advantages of the present invention will be apparent from the following description taken in conjunction with the accompanying drawings.

DESCRIPTION OF THE PREFERRED EMBODIMENT

Figure 1:
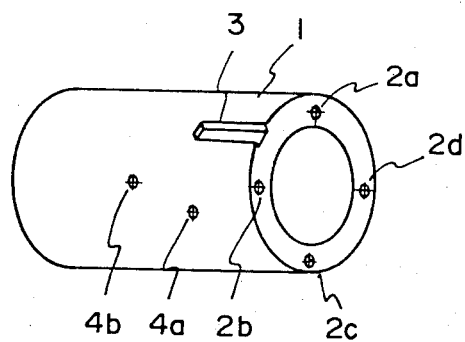
FIG. 1 is an illustrative view showing a turned workpiece which has been additionally machined to provide screw holes, a keyway and other holes.

Referring to FIG. 1, a workpiece 1 which has already been subjected to a turning operation is shown to include screw holes 2a, 2b, 2c, 2d, a keyway 3 and holes 4a, 4b located at predetermined rotational positions. The workpiece is provided with the keyway and various holes through a machining operation that may proceed as follows. The workpiece 1 held in a chuck which is not shown is brought to a predetermined rotational position by actuating a spindle drive motor, thereby bringing a machining position on the workpiece to a point which is opposite a rotary tool. The tool is then rotated to form the screw hole or the like in the workpiece at the machining position thereof. A variable position spindle orientation operation of this type wherein a spindle can be stopped at any desired rotational position is an important requirement in numerically controlled machine tools.

Figure 2:
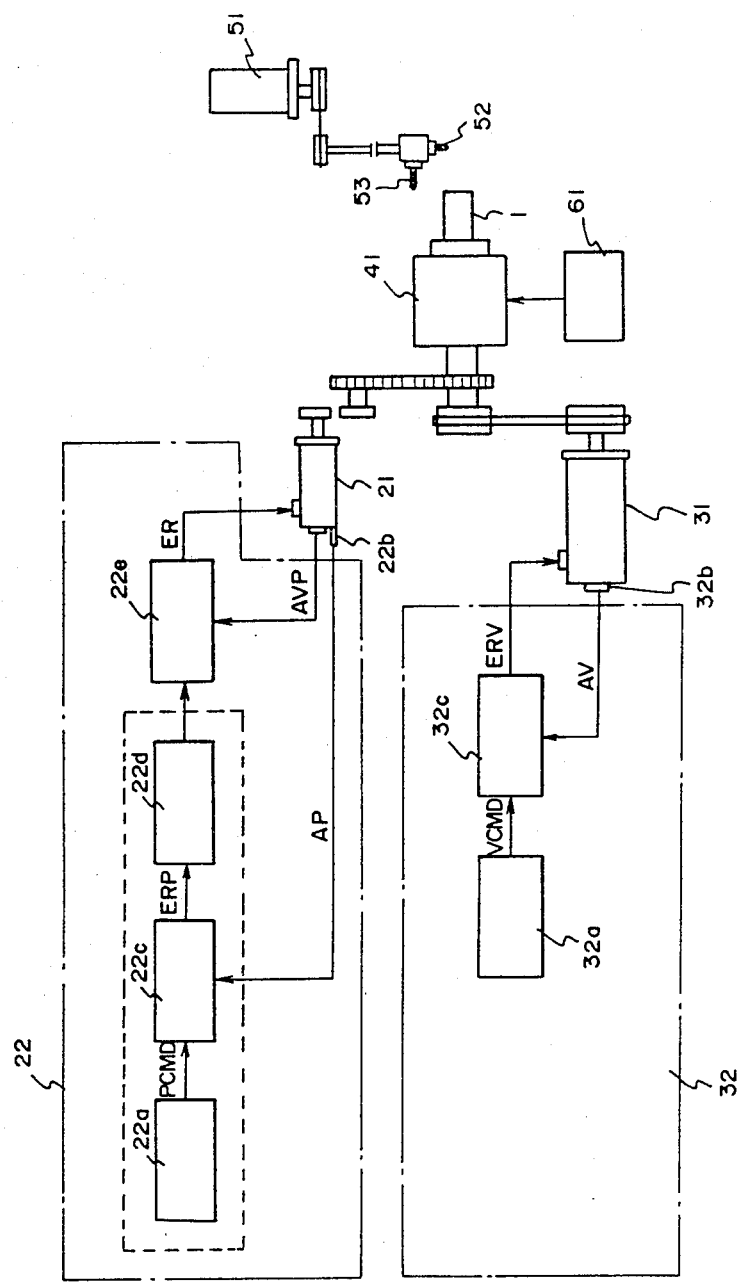
FIG. 2 is a block diagram of conventional circuitry for stopping a spindle at arbitrary positions.

A conventional circuit for accomplishing such arbitrary rotational positioning of a spindle is shown in the block diagram of FIG. 2. Before describing the conventional circuit, however, it should be noted that, in a turning center or the like, a spindle (and hence the workpiece) must be rotated at an instructed rotational speed during the turning operation, and must be stopped and positioned accurately at a predetermined rotational position in order to permit the screw holes, keyway and other holes to be machined following the turning operation. To this end, the conventional system shown in FIG. 2 is provided with two motors for the spindle, namely a motor 21 for positioning the spindle at an arbitrary rotational position, and another motor 31 for driving the spindle rotatively at the instructed speed. The motor 21 is driven by a position control loop 22, and the motor 31 is driven by a speed control loop 32 which is completely independent of the position control circuit 22. The control operation is such that either the motor 21 or the motor 31 is driven selectively, depending upon whether the spindle is to be positioned at the instructed point or is to be rotated at the instructed speed.

To rotate the spindle at the instructed speed in the case of a turning operation, a speed control circuit 32c derives a deviation or error speed ERV between a command speed VCMD obtained from a rotational speed command circuit 32a and an actual speed AV obtained from a tachogenerator 32b. The motor 31 is so driven by a voltage proportional to the error speed ERV as to diminish the error speed ERV to zero.

To stop the spindle 41 at a predetermined rotational position, a position control circuit 22c derives a deviation or positional error ERP between a position command PCMD obtained from a position command circuit 22a and an actual position signal AP generated by a resolver 22b connected to the shaft of the motor 21. Next, a digital-to-analog (DA) converter 22d converts the positional error ERP into an analog voltage which is applied to a speed control circuit 22e. The latter circuit then derives a difference ER between the positional error ERP, in analog form, and the actual speed AVP of the motor 21 as generated by a tachogenerator 22f. The motor 21 is driven by a voltage proportional to the difference ER in such a manner that the position error ERP is reduced to zero.

It should be noted that a clutch mechanism (not shown) must be provided in the conventional apparatus since the motor 21 is disengaged from the spindle 41 when the spindle is driven by the motor 31.

When the spindle is being rotated at the instructed speed in accordance with the foregoing control operation, a DC motor 51 is actuated by a numerical control device (not shown) to transport a turning tool 52 in accordance with a desired instructed configuration, whereby the workpiece 1 is machined as specified by the instructions. To drill a screw hole into the workpiece 1, the spindle 41 is positioned and then fixed by a clamping mechanism 61. A desired rotary tool 53 is selected, brought into position by driving the DC motor 51, and then rotated to drill the screw hole into the workpiece.

Figure 3:
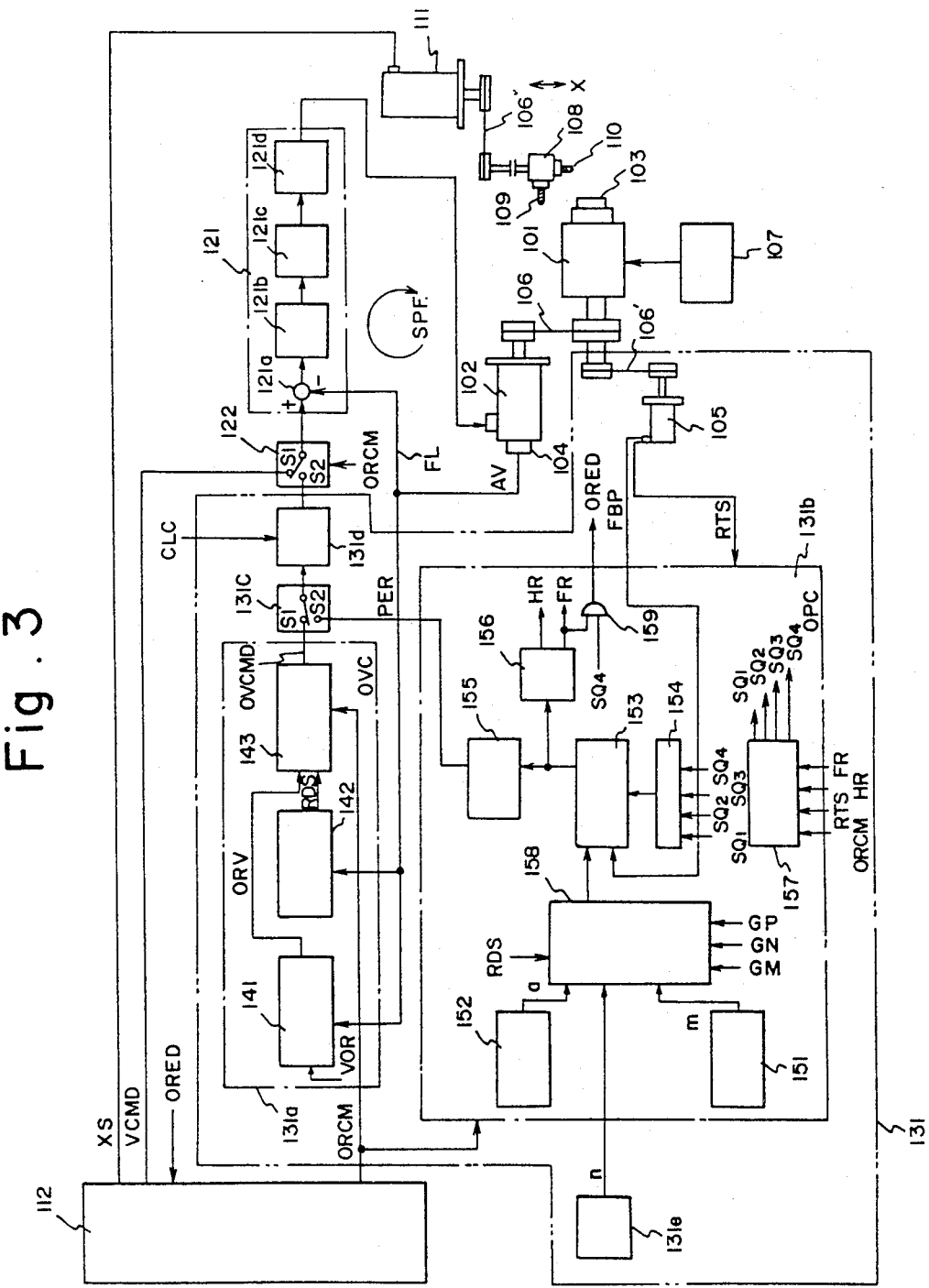
FIG. 3 is a circuit block diagram of a spindle orientation control apparatus according to the present invention.

Reference will now be had to FIG. 3 to describe the spindle orientation control apparatus of the present invention. A spindle 101 is driven by a single spindle motor 102 through the intermediary of a belt 106 and is adapted to rotate a workpiece 103. A tachometer 104 is mounted on the shaft of the spindle motor 102 and generates an actual voltage signal AV of a voltage which corresponds to the actual rotational speed of the motor 102 and hence, the spindle 101 and workpiece 103. A optical rotary encoder 105 is coupled to the spindle 101 via a belt 106' and generates a single position pulse FBP each time the spindle 101 rotates by a predetermined angle, as well as a one-revolution signal RTS each time the spindle 101 makes one complete revolution. A clamping mechanism 107 is adapted to clamp the spindle 101 against movement when the spindle has been stopped following the orientation thereof. A rotary tool 109 and a turning tool 110 are mounted on a tool magazine 108 and are transported in the direction of the X-axis by an X-axis drive motor 111 controlled by a numerical control device or "NC device" 112. The tool magazine 108 is coupled to the drive motor 111 through a belt 106". The NC device 112 produces such signals as an orientation command ORCM, rotational speed command VCMD and a drive signal XS for driving the X-axis drive motor 111.

A well-known speed control circuit 121 includes an adder 121a whose output is a voltage indicative of a speed error representing a deviation between the speed command VCMD and the actual speed AV at the time of a speed control operation, a well-known phase compensating circuit 121b, a phase control circuit 121c responsive to the speed error voltage from the adder 121b for controlling the timing at which thyristors are fired in a thyristor convertor 121d, and the thyristor convertor 121d for supplying the spindle motor 102 with a voltage that is in accordance with the speed error. The speed control circuit 121, tachogenerator 104 and a speed feedback line FL constitute a speed control loop SPF.

A spindle orientation control circuit 131, enclosed by the two-dot phantom line, includes a speed command circuit 131a which issues a spindle command speed signal OVCMD at the time of an orientation control operation, a position control circuit 131b for stopping the spindle at an arbitrary rotational position, a changeover switch 131c for delivering selectively either the command speed signal OVCMD from the speed command circuit 131a or a positional error signal PER from the position control circuit 131b at the time of the orientation control operation, a gain changeover control device 131d for adjusting speed gain in response to a clutch changeover signal CLC, and a switch 131e for externally setting the spindle stopping position in the form of a 12-bit digital value. Specifically, and with reference also to FIG. 4, the switch 131e is employed to enter pulses of a number n corresponding to an angle of N degrees measured from the home position MRP to the spindle stopping position CP. RTSP in FIG. 4 denotes an angular position at which the one-revolution signal RTS is generated. Thus, if the rotary encoder 105 generates $2^{12}$ (=4096) pulses owing to one revolution of the spindle 101, then the switch 131e is manipulated to enter a number of pulses n equivalent to $(N)/(360)\cdot 4096$ digitally in the form of 12 bits in order to stop the spindle at the point CP.

The speed control circuit 131a includes an orientation speed sensing circuit 141 which generates, at the time of an orientation operation, a speed attainment signal ORV upon sensing that the spindle 101 has attained a predetermined speed $V_{OR}$ at which orientation is possible, a rotational direction sensing circuit 142 for producing a rotational direction signal RDS upon sensing the direction in which the spindle is rotating, and an orientation speed command circuit 143 for producing the spindle command speed signal OVCMD at the time of an orientation operation.

The position control circuit 131b includes an internal switch 151, set at the factory, for establishing the spindle stopping position by digitally setting in the form of 12 bits, in a counter to be described later, the number of pulses m, equivalent to $(M)/(360)\cdot 4096$, corresponding to the number of degrees M measured from the rotational position RTSP to the home position MRP in FIG. 4. Also included is a register 152 in which a 12-bit digital value a (1000 . . . 01 = 2049 in this embodiment) has been set at the factory, a 12-bit up-down counter 153 having a capacity for counting 4096 of the feedback pulses FPB which are generated by the rotary encoder 105 during one complete revolution of the spindle, an up-down control circuit 154 for controlling the direction in which the up-down counter 153 counts, a digital-to-analog (DA) converter 155 for producing an analog voltage that is proportional to the content of the up-down counter 153, a decoder 156 for generating a signal HR when the content of the up-down counter 153 has attained a value b equivalent to $[(2^{12}-1)-a]$ (in this embodiment, b is equal to 011 . . . 10 = 2046, which is equivalent to the number of feedback pulses generated by the rotary encoder 105 during approximately 180 degrees of spindle rotation), and for generating a signal FR when the content of the counter has attained a value 00 ... 0 (all zeros), a sequence counter 157, a numerical value selection command circuit 158 for selecting one of the numerical values a, m, n and for presetting the up-down counter 153 to the selected value, and an AND gate 159 for delivering an orientation completion signal ORED. The sequence counter 157 delivers a first sequence state signal $SQ_1$, equivalent to logical "1", in response to the generation of the orientation command ORCM, as well as second, third and fourth sequence states $SQ_2$, $SQ_3$ and $SQ_4$, all equivalent to logical "1", in response to the generation of the one-revolution signal RTS and the signals HR (at logical "1") and FR (at logical "1"), respectively. The numerical value selection command circuit 158 presets the up-down counter 153 to m or −m in accordance with the spindle rotational direction signal RDS if the one-revolution signal RTS is generated (gate signal GM goes to logical "1") when the signal $SQ_1$ is a "1", presets the counter to n or −n in accordance with the spindle rotational direction signal RDS if the signal HR goes to logical "1" (gate signal GN goes to logical "1") when signal $SQ_2$ is a "1", and presets the counter to a or −a if signal FR goes to logical "1" (gate signal GP goes to logical "1") when $SQ_3$ is a "1".

Figure 4:
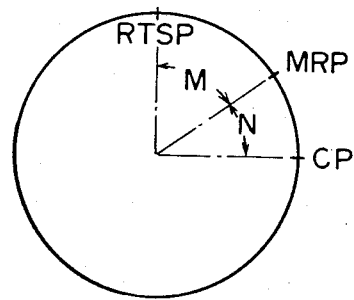
FIG. 4 is an illustrative view which is useful in describing the relationship among a home position, a position at which a one-revolution signal is generated, and a spindle stopping position.

It is noteworthy that in accordance with the invention, no sensor need be provided for sensing the home position MRP even though the spindle stopping position CP in FIG. 4 is instructed by means of the switch 131e on the basis of home position MRP. The sensor is deleted because it is high in cost and is not readily capable of sensing the home position accurately. In accordance with a feature of the invention, the sensor is replaced by an arrangement in which the number of degrees M measured from the position RTSP to the home position MRP is set in the internal switch 151. Since the value of the angle M will differ from machine to machine depending upon how the rotary encoder 105 is mounted, M is measured for each machine and the number of pulses m corresponding thereto is then set in the switch 151. The switch 151 is installed within the apparatus to prevent problems resulting from the set value m being changed accidentally.

Figure 7:
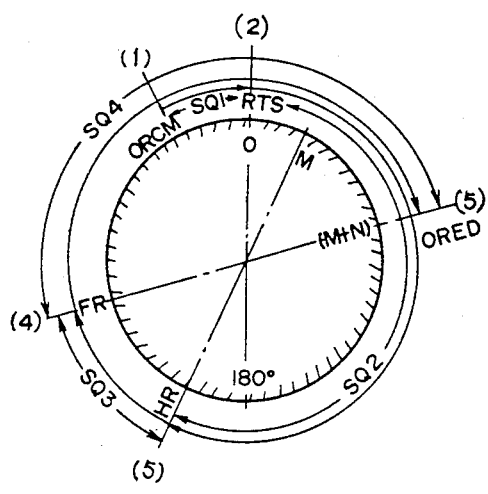
FIGS. 7(A) and 7(B) are illustrative views for a case in which spindle orientation is effected during forward spindle rotation.
Figure 7:
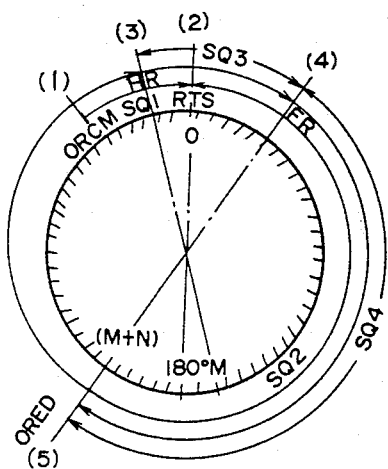
Figure 8:
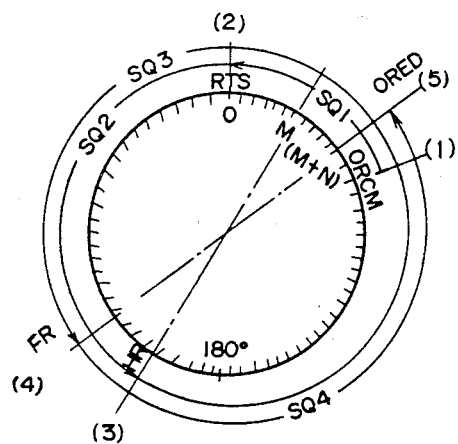
FIGS. 8(A) and 8(B) are illustrative views for a case in which spindle orientation is effected during reverse spindle rotation.
Figure 8:
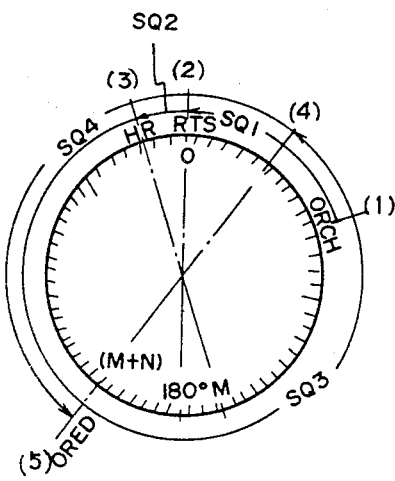

An orientation control operation in accordance with the present invention will now be described with reference to FIGS. 7, 8.

In accordance with the invention as described above, the switch 131e for externally setting the stopping position of the spindle is employed for entering the number of pulses n corresponding to the angle N from the home position MRP to the stopping position CP. The number of pulses m corresponding to the angle M from the position RTSP to the home position MRP is preset in the internal switch 151 for setting the stopping position of the spindle. These operations specify the spindle stopping position CP.

With the spindle rotating in the forward direction, assume that the orientation command ORCM is generated ($SQ_1$ goes to logical "1"), when the spindle is at the position (1) in FIG. 7(A). The generation of the command ORCM causes the spindle to begin rotating at the speed $V_{OR}$ at which orientation becomes possible, and the one-revolution signal RTS is generated ($SQ_2$ goes to logical "1") when the spindle is at the position (2). At this time the numerical value −m is preset in the up-down counter 153 in FIG. 3. The spindle continues rotating at the speed $V_{OR}$ and the up-down counter 153 counts up the feedback pulses FBP, with the content of the counter attaining the value b when the spindle reaches the position (3) after rotating by an angle of (B+M) degrees which corresponds to (b+m) feedback pulses. At this time the decoder 156 generates the signal HR ($SQ_3$ goes to logical "1"), thereby presetting the up-down counter 153 to −n. The spindle continues rotating at the speed $V_{OR}$ and the up-down counter 153 counts up the feedback pulses FBP, with the content of the counter attaining the value zero when the spindle reaches the position (4) after rotating by an angle of N degrees which corresponds to n feedback pulses, at which time the decoder 156 generates the signal FR ($SQ_4$ goes to logical "1"). The logical "1" value of signal FR causes the counter 153 to be preset to the value a ($=2^{12}-1-b$), that is, to a number of pulses (100 ... 01) corresponding to (360−B) degrees, which is approximately equal to 180 degrees. At this point the operation shifts from speed control to position control, with the contact of the changeover switch 131c being changed over from $S_1$ to $S_2$. From this point on the spindle drive motor 102 is driven in accordance with an error voltage (the output of the DA converter 155) that is proportional to the content of the up-down counter 153. The counter 153 now counts down feedback pulses since the circuitry is now operating in accordance with position control. The content of the counter reaches zero when the spindle 101 arrives at the position (5) after rotating by (360−B) degrees, and AND gate 159 delivers the orientation completion signal ORED which is coupled to the NC device 112 to terminate the orientation control operation. In accordance with the above operation, the spindle 101, following the generation of the one-revolution signal RTS, is rotated by (B+M) degrees during the interval that $SQ_2$ is a "1", by N degrees during the interval that $SQ_3$ is a "1", and by (360−B) degrees during the interval that $SQ_4$ is a "1". Thus, the spindle is stopped correctly at the instructed rotational position after having been rotated by a total of 360+(M+N) degrees. FIG. 7(A) illustrates (M+N) as being less than 180 degrees, but the control operation is entirely the same for a case where M+N is greater than 180 degrees, as illustrated in FIG. 7(B). It should also be noted that while the values −m and −n were described as being preset in the up-down counter 153 owing to the generation of the signals RTS and HR, respectively, an arrangement is possible wherein the values −n, −m are preset in the counter by the respective signals RTS, HR.

The control operation described above dealt with forward rotation of the spindle 101. If the orientation command ORCM is generated when the spindle is rotating in the reverse direction, then the orientation control operation proceeds while rotating the spindle is said direction and is almost the same as the operation described above. The only difference is that the values m, n are preset in the counter instead of −m, −n, and the value $-[(2^n-1)-b]$ instead of $(2^n-1)-b$.

Figure 5:
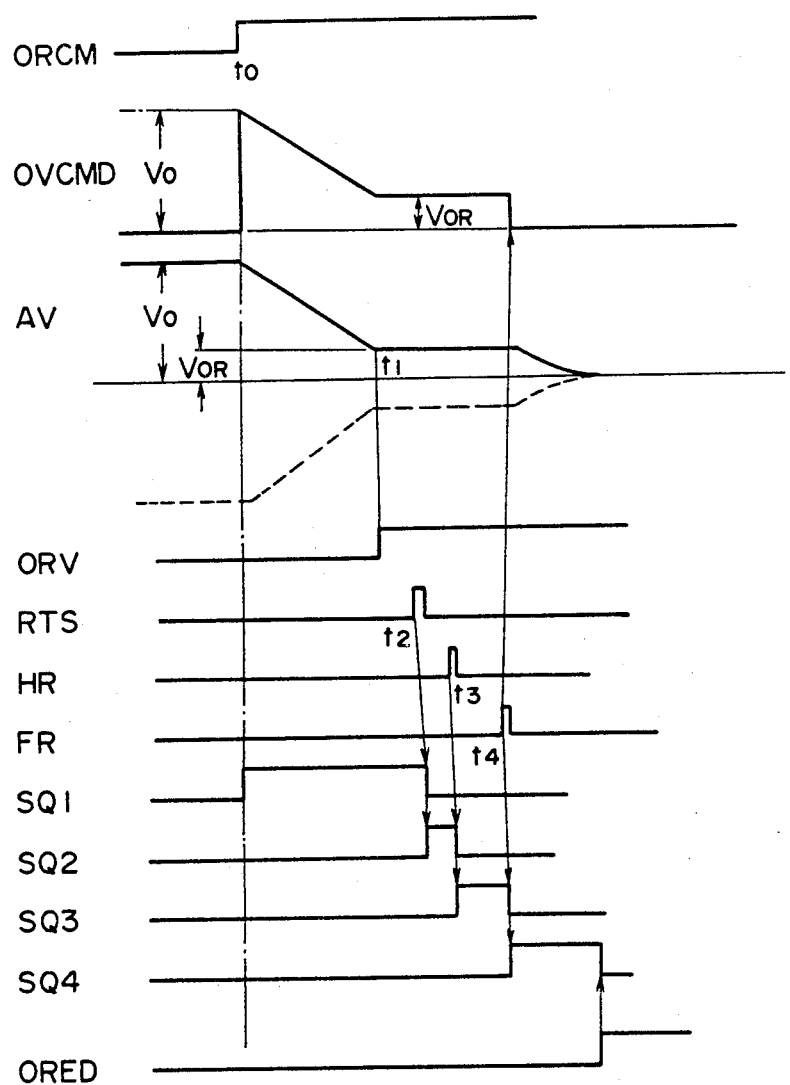
FIGS. 5 and 6 are waveform diagrams showing signals associated with the circuitry of FIG. 4 at the time that an orientation command is generated, FIG. 5 for a case in which the spindle is rotating and FIG. 6 for a case in which the spindle is at rest.
Figure 6:
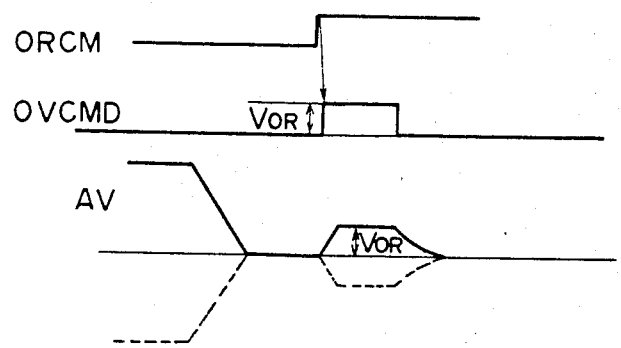

Next, the operation of the invention will be described in conjunction with the waveforms of FIGS. 5 and 6 while referring to FIG. 9A.

Assume that the spindle 101 is rotating in the forward direction at the speed $V_o$ owing to the speed command CVMD from the NC device 112. Under this condition, when the orientation command ORCM goes to logical "1" ($SQ_1$ to logical "1") at time $t_0$ (position (1) in FIG. 7A), the contact of the changeover switch 122 is changed over from $S_1$ to $S_2$ and the orientation speed command circuit 143 simultaneously issues the speed command OVCMD which decreases toward zero from the value $V_o$. As a result, the spindle motor 102 begins decelerating as it follows the decreasing speed command OVCMD and, at time $t_1$, attains a rotational speed of $V_{or}$ at which orientation of the spindle becomes possible. The orientation speed detection circuit 141 detects this speed and generates the speed attainment signal ORV (logical "1"). The speed command circuit 143 responds to the "1" logic by delivering a $V_{OR}$ output as the speed command OVCMD. The spindle 101 therefore continues to be rotated at the constant speed $V_{OR}$. The rotary encoder 105 generates the one-revolution signal RTS at time $t_2$ (position (2) in FIG. 7A) so that the second sequence state is achieved (SQ$_2$ to logical "1"). The generation of the signal RTS sends the gate signal GM to logical "1" so that the numerical value $-m$ which has been set in the internal switch 151 is preset in the up-down counter 153 through the value selection command circuit 158. Meanwhile, the spindle 101 continues to be rotated at the speed $V_{OR}$, and the rotary encoder 105 generates a single feedback pulse FBP each time the spindle rotates by a predetermined amount, namely 360°/4096. The feedback pulses are counted up in the up-down counter 153. Whether the counter 153 counts the feed back pulses up or down is determined by the up-down control circuit 154, as noted earlier. Specifically, the pulses are counted up in the sequence states SQ$_2$, SQ$_3$, and counted down in the sequence state SQ$_4$. The spindle continues to rotate and, at time $t_3$ (position (3) in FIG. 7A), has rotated through an angle of (B+M) degrees (approximately equal to 180+M degrees) which corresponds to (b+m)−number of feedback pulses. Therefore, at time $t_3$, the content of the up-down counter 153 attains the value b, and the decoder responds by issuing the signal HR (logical "1"), whereby the third sequence state is attained (SQ$_3$ to logical "1"). As a result, the gate signal GN goes to logical "1", and the numerical value −n which has been set in the external switch 131e is preset in the up-down counter 153 through the value selection command circuit 158. The spindle 101 still continues to be rotated at the speed $V_{OR}$, and at time$_4$ (position (4) in FIG. 7A) has rotated through an angle of N degrees, equivalent to n−number of feedback pulses. Therefore, at time $t_4$, the content of the up-down counter 153 becomes zero, signal FR goes to logical "1", and the fourth sequence state is attained. The changeover switch 131c responds to the "1" logic of signal FR by switching its contact from S$_1$ to S$_2$, thereby switching from speed control to position control. Concurrently, the numerical value a which has been set in the register 152 is preset in the up-down counter 153 through the value selection command circuit 158. (The value a, it should be noted, is equivalent to the number of feedback pulses corresponding to approximately 180 degrees of spindle rotation). Further, the speed command OVCMD becomes zero at time $t_4$. The DA converter 155 produces the positional error signal PER of a voltage proportional to the content of the up-down counter 153, and the spindle motor 102 continues to be rotated in the forward direction at a speed which now corresponds to the signal PER. In accordance with position control, the content of the up-down counter 153 is counted down each time a feedback pulse FBP is generated, with the result that the output voltage of the DA converter 155 gradually decreases, the actual speed AV of the spindle motor 102 diminishing in accordance with the DA converter output. When the spindle has rotated through an angle of (360−B) degrees (approximately 180 degrees), the content of the counter 153 becomes zero (FR to logical "1"), and the AND gate 159 sends the orientation completion signal ORED to the NC device 112 to terminate the orientation control operation.

In the case described above, the orientation command ORCM goes to logical "1" during forward rotation of the spindle. It should be noted that the control operation proceeds in almost the same manner even when the command ORCM goes to logical "1" during reverse rotation of the spindle. In the latter case the actual spindle speed AV changes as depicted by the dotted line in FIG. 5, the spindle 101 being brought to a stop at the instructed rotational position in an accurate manner.

The control operation proceeds in almost the same fashion even if the spindle 101 is at rest when the orientation command ORCM goes to logical "1". The change in the actual spindle speed AV for this case is shown in FIG. 6.

In accordance with the present invention as described above, a single spindle motor enables the spindle to be rotated at the instructed rotational speed and to be stopped at any desired rotational position. Employing only one spindle motor reduces the total cost of the apparatus as well as its size. It is also possible to employ a standard NC device without requiring that the NC device be modified. In addition, the spindle can be oriented continuously without requiring that it be returned repeatedly to the home position and without requiring that it be halted temporarily, even when the orientation control operation is effected during spindle rotation. The control operation can, moreover, be performed regardless of the direction in which the spindle is rotating. These advantages greatly shorten the time required for positioning. An accurate orientation operation proceeds rapidly since the speed control is performed up to a point a prescribed number of degrees short of the instructed stopping position, with the position control coming into effect from the prescribed point onward. Furthermore, a greater reduction in cost is achieved since a home position sensor need not be provided regardless of the fact that the stopping position CP is instructed on the basis of the home position. Although the angle M measured from the position RTSP, at which the one-revolution signal is generated, to the home position MRP, differs depending upon how the rotary encoder or its equivalent is mounted, a number of pulses corresponding to the angle M is preset in the internal switch 151 after the angle is measured beforehand. This simplifies the instruction and control operations associated with the stopping position since the size of the angle M need not be considered during said instruction and control operations.

Although the present invention has been described in its preferred form with a certain degree of particularity, it is obvious that many modifications and variations are possible in the light of the above teachings. For example, it is possible to generate 4096 position pulses by using a rotary encoder generating 1024 position pulses during one complete rotation of the spindle and a quadrupling circuit instead of the rotary encoder 105 in FIG. 3. It is therefore to be understood that within the scope of the appended claims, the invention may be practiced otherwise than as specifically described.

What we claim is:

1. A spindle orientation control apparatus which comprises:
a motor for driving a spindle;

speed control means for rotating the spindle at a speed in accordance with a command speed;

position control means for stopping the spindle at a commanded spindle stopping position;

stopping position command means for digitally instructing the commanded spindle stopping position;

a position sensor for generating a one-revolution pulse each time the spindle makes one complete revolution and a position pulse each time the spindle rotates by a predetermined angle;

error monitoring means for monitoring an error between said commanded spindle stopping position and the actual rotational position of the spindle upon receiving each of the pulses generated by said position sensor, said error monitoring means generating a signal when the error attains a predetermined value; and means for generating a signal indicative of an orientation speed;

the spindle being speed-controlled so as to rotate at the orientation speed until said error monitoring means generates said signal, and positioned-controlled after the generation of said signal so as to reduce the error to zero, the speed and position control operations being performed when the apparatus is in a spindle orientation control mode.

2. A spindle orientation control apparatus according to claim 1, in which the error monitoring means, following the generation of the one-revolution pulse by said position sensor, generates said signal when the error attains a predetermined value after the spindle has passed said commanded spindle stopping position.

3. A spindle orientation control apparatus according to claim 2, in which the stopping position command means includes first setting means for setting an angle of rotation M from the position at which the one-revolution pulse is generated, to the position of a home point, and second setting means for setting an angle of rotation N from the position of the home point, to the spindle stopping position.

4. A spindle orientation control apparatus according to claim 2, in which the predetermined value for the error is set to a numerical value corresponding to 180 degrees.

5. A spindle orientation control apparatus according to claim 3, in which the first setting means is incorporated within the apparatus, and the second setting means is disposed on the outside of the apparatus.

6. A spindle orientation control apparatus according to claim 5, said position sensor is composed by a optical rotary encoder which generates the one-revolution pulse and plural position pulses during one complete revolution.

* * * * *

UNITED STATES PATENT AND TRADEMARK OFFICE
CERTIFICATE OF CORRECTION

PATENT NO. : 4,347,470
DATED : August 31, 1982
INVENTOR(S) : Kohzai et al.

It is certified that error appears in the above—identified patent and that said Letters Patent is hereby corrected as shown below:

Front page, [73] Assignee, after "Limited," insert --Tokyo,--.

Col. 3, line 43, "A" should be --an--.

Col. 6, line 52, "is" should be --in--.

Col. 10, line 24, "a" should be --an--.

Signed and Sealed this

Fifteenth Day of March 1983

[SEAL]

Attest:

GERALD J. MOSSINGHOFF

Attesting Officer

Commissioner of Patents and Trademarks